US010085312B2

(12) United States Patent
Yau

(10) Patent No.: US 10,085,312 B2
(45) Date of Patent: Sep. 25, 2018

(54) BUS BAR CURRENT CONTROL CIRCUIT, CONSTANT-CURRENT DRIVING CONTROLLER AND LED LIGHT SOURCE

(71) Applicant: Delight Innovative Technologies Limited, Hong Kong (CN)

(72) Inventor: Kinhing Yau, Hong Kong (CN)

(73) Assignee: DELIGHT INNOVATIVE TECHNOLOGIES LIMITED, Hong Kong (CN)

( * ) Notice: Subject to any disclaimer, the term of this patent is extended or adjusted under 35 U.S.C. 154(b) by 0 days.

(21) Appl. No.: 15/513,898

(22) PCT Filed: Oct. 30, 2015

(86) PCT No.: PCT/CN2015/093425
§ 371 (c)(1),
(2) Date: Mar. 23, 2017

(87) PCT Pub. No.: WO2016/045644
PCT Pub. Date: Mar. 31, 2016

(65) Prior Publication Data
US 2017/0303354 A1 Oct. 19, 2017

(30) Foreign Application Priority Data
Sep. 25, 2014 (CN) .......................... 2014 1 0497139

(51) Int. Cl.
*H05B 37/02* (2006.01)
*H05B 33/08* (2006.01)
*H02M 3/15* (2006.01)

(52) U.S. Cl.
CPC .......... *H05B 33/0815* (2013.01); *H02M 3/15* (2013.01); *H05B 33/0845* (2013.01)

(58) Field of Classification Search
CPC ............ H05B 33/0809; H05B 33/0815; H05B 33/0845; H05B 33/0851

USPC .................................................. 315/224, 294
See application file for complete search history.

(56) References Cited

U.S. PATENT DOCUMENTS 5,959,443 A * 9/1999 Littlefield ............... G05F 1/565
323/283
2007/0171688 A1* 7/2007 Bao .................... H02M 3/33523
363/56.09

(Continued)

FOREIGN PATENT DOCUMENTS

CN 101784147 A 7/2010
WO WO 2016/045644 A1 3/2016

OTHER PUBLICATIONS

International Search Report issued in PCT/CN2015/093425 including English translation, dated Jan. 8, 2016, 5 pages.

*Primary Examiner* — Tung X Le
(74) *Attorney, Agent, or Firm* — Harness, Dickey & Pierce, P.L.C.; Anthony G. Fussner

(57) ABSTRACT

The present invention relates to a busbar current control circuit, a constant current drive controller and an LED light source, wherein the busbar current control circuit comprises a branch resistor, a branch capacitor and a branch current source, the branch resistor and the branch capacitor are connected in parallel to form a branch, one end of the branch is connected a position between the busbar resistor and the load, and the other end is connect to the branch current source; the branch current source outputs to the branch a current of adjustable magnitude, the sum of the voltage on the busbar resistor and the voltage on the branch resistor remains constant. Wherein the branch resistor occupies a portion of the voltage of the busbar resistor so that the magnitude of the current output by the busbar changes continuously, that is, when the current flowing into the (Continued)

branch increases, the voltage occupied by the branch resistor increases and the voltage on the busbar resistor decreases, so as to reduce the current on the busbar. Since the branch current is smoothly adjusted by the branch current source, the regulation of the Output current on the busbar is also smooth. This avoids the use of the SPWM wave or the dimming switch circuit in the prior art, and the stroboscopic phenomenon due to the discontinuity of the driving current.

10 Claims, 2 Drawing Sheets

(56) References Cited

U.S. PATENT DOCUMENTS

| | | | |
|---|---|---|---|
| 2009/0195180 A1* | 8/2009 | Chenetz | H05B 33/0818 315/291 |
| 2011/0037399 A1* | 2/2011 | Hung | H05B 33/0815 315/219 |
| 2011/0309754 A1 | 12/2011 | Ashdown | |
| 2013/0043799 A1* | 2/2013 | Siu | H05B 33/0824 315/193 |
| 2014/0091723 A1* | 4/2014 | Kuo | H05B 33/0857 315/200 R |
| 2014/0145632 A1* | 5/2014 | Wey | H05B 33/0815 315/193 |
| 2014/0321860 A1* | 10/2014 | Kido | H04B 10/116 398/118 |
| 2015/0108908 A1* | 4/2015 | Denvir | H05B 33/0815 315/186 |

* cited by examiner

BUS BAR CURRENT CONTROL CIRCUIT, CONSTANT-CURRENT DRIVING CONTROLLER AND LED LIGHT SOURCE

CROSS-REFERENCE TO RELATED APPLICATIONS

This application is a U.S. National Stage of International Application No. PCT/CN2015/093425, filed Oct. 30, 2015, which claims the benefit of, and priority to, Chinese Patent Application No. 201410497139.1, filed Sep. 25, 2014. The entire disclosures of each of the above applications are incorporated herein by reference.

TECHNOLOGY FIELD

The present invention relates to an LED driving technique, and more particularly to a busbar current control circuit, a constant current drive controller and an LED light source.

BACKGROUND TECHNIQUE

With the invention and application of new semiconductor devices, the luminous efficiency and luminous intensity of LED (Light Emitting Diode) are increasingly improved. LEDs are gradually becoming a new generation of light source. Currently, the LEDs are usually driven by constant current. Constant current drive circuits are achieved through dedicated LED driver chips. When adjusting the brightness of an LED, a serial digital signal and PWM (Pulse Width Modulation) signal would be added to the LED constant current driver chip. This dimming control method uses PWM wave to adjust the pulse duty cycle of the power switch transistor in the high frequency inverter to realize the adjustment of the LED output power.

The principle is that, if the power switch transistor is operating in the ZVS (Zero Voltage Switch) state when the power switch transistor is ON, the power switch transistor will achieve a ZCS (Zero Current Switch) operating state by means of an absorption capacitor at the instant of being turned off, so that the ZVS operating state can be achieved while EMI (Electromagnetic Interference) and the electrical stress of the power switch transistor can be significantly reduced. However, if the pulse duty cycle of PWM wave is too small to keep the continuousness of the drive current, the power switch transistor will lose the ZVS operating conditions, resulting in the stroboscopic situation of LED lights. In addition, the generation of PWM waves requires an external waveform generator so as to increase the complexity and cost of the circuit.

SUMMARY OF THE INVENTION

With respect to the disadvantage of the stroboscopic situation of the LED constant current drive circuit in the prior art, the present invention provides a busbar current control circuit which can continuously adjust the magnitude of busbar current inputted to the load by connecting an active branch to the busbar to occupy the voltage drop on the busbar resistor, a constant current drive controller using the circuit, and an LED light source using the constant current drive controller.

The technical solution of the invention is as follows:

A busbar current control circuit is characterized in that it comprises a branch resistor, a branch capacitor and a branch current source, wherein the branch resistor and the branch capacitor are connected in parallel to form a branch; one end of the branch is connected to a position between the busbar resistor and the load, and the other end is connected to the branch current source; and the branch current source outputs a current of adjustable magnitude to the branch.

The branch capacitor is a capacitor of 0.01 to 0.22 µF, and the branch resistor is a resistor of 0.5 to 2 KΩ.

The branch current source is a constant current source.

The constant current source comprises a first triode, a second triode, an equivalent voltage input source and a branch power source; wherein a fixed pin of the variable resistor is connected to the branch power source and the other fixed pin is connected to the base of the first triode, the moving pin of the variable resistor is connected to the base of the second triode; the base of the first triode is connected to a position between the base of the second triode and the moving pin, and the collector of the first triode is connected to its own base and its emitter is grounded; the collector of the second triode is used as the output of the constant current source and its emitter is grounded.

The first triode may be replaced with a first diode, wherein the positive electrode of the first diode is simultaneously connected to the other fixed pin, the base of the second triode and the moving pin, the negative electrode of the first diode is grounded, and the equivalent voltage input source is the variable resistor or other variable voltage input circuit.

It further comprises a first resistor and a second resistor, the first resistor being connected between the base of the second triode and the moving pin, one end of the second resistor being connected between the first resistor and the base of the second triode, and the other end being connected to the other fixed pin.

The emitter of the second triode is grounded through a resistor.

A constant current drive controller using the busbar current control circuit, is characterized in that it further comprises a constant current control chip, a busbar resistor, a second diode and a energy storage inductor, the constant current control chip comprises a first voltage measurement pin, a second voltage measurement pin and a switch pin; the two ends of the busbar resistor are respectively connected to a power supply and the positive terminals of the load, the negative terminal of the load is connected to one end of the energy storage inductor, the other end of the energy storage inductor is connected to the positive terminal of the second diode and the switch pin, the first voltage measurement pin is connect to a position between the busbar resistor and the power supply; one end of the branch formed by the branch resistor and the branch capacitor connected in parallel in the busbar current control circuit is connected to a position between the busbar resistor and the load, the other end of the branch is connected to the second voltage measurement pin; the sum of the voltage on the busbar resistor and voltage on branch resistor remains constant.

The first voltage measurement pin and the second voltage measurement pin are used for measuring a voltage between the busbar resistor and the branch resistor.

The constant current control chip is a switching constant current driving chip.

The first voltage measurement pin is a power input terminal of the switching constant current driving chip.

The constant current control chip, the busbar resistor, the second diode and the energy storage inductor are hybridly packaged.

An LED light source using the constant current drive controller is characterized in that the load connected to the constant current drive controller is an LED load.

The technical effect of the invention is as follows:

A busbar current control circuit of the invention comprises a branch resistor, a branch capacitor and a branch current source, wherein the branch resistor and the branch capacitor are connected in parallel to form a branch, one end of the branch is connected a position between the busbar resistor and the load, and the other end is connect to the branch current source; the branch current source outputs to the branch a current of adjustable magnitude, the sum of the voltage on the busbar resistor and the voltage on the branch resistor remains constant. Wherein the branch resistor occupies a portion of the voltage of the busbar resistor so that the magnitude of the current output by the busbar changes continuously, that is, when the current flowing into the branch increases, the voltage occupied by the branch resistor increases and the voltage on the busbar resistor decreases, so as to reduce the current on the busbar. Since the branch current is smoothly adjusted by the branch current source, the regulation of the output current on the busbar is also smooth. This avoids the use of the SPWM wave or the dimming switch circuit in the prior art, and the stroboscopic phenomenon due to the discontinuity of the driving current.

As the branch resistor is connected with a larger branch capacitor in parallel, regardless of how the voltage on the busbar resistor changes, the voltage on the branch resistor tends to be stable and will not affect the characteristics of the busbar circuit itself.

The busbar current control circuit according to the present invention can be used as long as it is connect to the busbar without the need of complicated external circuit and waveform generating circuit, which simplifies the circuit design, reduces the use cost and is convenient and reliable. The present invention can be applied not only to the brightness modulation of the LED light source but also to other fields, such as the field of motor, where the constant current drive is required.

The branch current source of the present invention is a constant current source. The constant current source comprises a first triode, a second triode, a variable resistor and a branch power source. Wherein a fixed pin of the variable resistor is connected to the branch power source and the other fixed pin is connected to the base of the first triode, the moving pin of the variable resistor is connected to the base of the second triode; the collector of the second triode is used as the output of the constant current source and its emitter is grounded. The output current of the branch current source is adjusted by continuously changing the equivalent voltage input source such as a variable resistor (0-10V output for variable voltage input control of the lamp) to output a continuously varying branch current. Since the first resistor and the second resistor are connected to the constant current source in the present invention so that the voltage between the base of the second triode and the ground point is attenuated in proportion to the output voltage of the variable resistor, it is helpful to the branch current fine-tuning, so that the LED operating current can be accurately set to extend the life of the LED.

A constant current drive controller of the present invention connects the busbar current control circuit between the busbar resistor and the load for adjusting an input load busbar current. This allows the combination and hybrid packaging of the busbar current control circuit and a dedicated constant current control chip, which is conducive to the stability of the components in use.

DESCRIPTION OF THE PREFERRED EMBODIMENTS

The present invention will be described with reference to the accompanying drawings.

Figure 1:
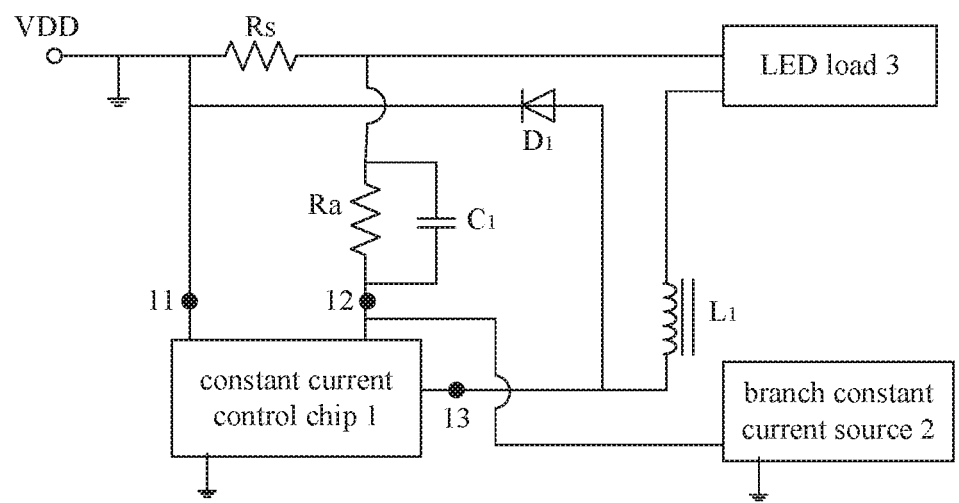
FIG. 1 is a schematic structural view of an LED constant current drive controller according to the present invention.

As shown in FIG. 1, the LED constant current drive controller of the present invention mainly includes a constant current control chip 1, a busbar current control circuit, an LED load 3, a busbar resistor Rs, a diode D1, an energy storage inductor L1 and a power supply VDD. As an example, the constant current control chip 1 is the switching constant current driver chip 6808. The first voltage measurement pin 11 (the power input terminal VIN), the second voltage measurement pin 12 (voltage sampling terminal CS) and the switch pin 13 (switch terminal DIM) of the constant current control chip 1 is mainly used. The output of the power supply VDD is connected to one end of the busbar resistor Rs. The other end of the busbar resistor Rs is connected to the positive terminal of the LED load 3. The negative terminal of the LED load 3 is connected to one end of the energy storage inductor L1. The other end of the energy storage inductor L1 is connected to the positive terminal of the diode D1 and the switching pin 13 of the constant current control chip 1. The negative terminal of the diode D1 are connected to a position between the busbar resistor Rs and the power supply VDD.

Between the busbar resistor Rs and the LED load 3, the busbar current control circuit is connected. The busbar current control circuit includes a branch formed in parallel by a branch resistor Ra and a branch capacitor C1, and a branch constant current source 2 for supplying power to the branch. The one end of the branch is connected to a position between the busbar resistor Rs and the LED load 3, and the other end is connected to the branch constant current source 2. The branch constant current source 2 supplies power to the branch, inputs the branch current IRa to the branch and generates the branch resistor voltage VRa on the branch resistor Ra. The first voltage measurement pin 11 is connected to one end of the busbar resistor Rs which is close to the power supply VDD. The second voltage measurement pin 12 is connected to the end of the branch which is far away from the busbar. The first voltage measurement pin 11 and the second voltage measurement pin 12 are used to measure the sum of the busbar resistor voltage VRs' and the branch resistor voltage VRa after occupied. The branch capacitor C1 in the present embodiment is preferably a capacitor of 0.01 to 0.22 μF, more preferably 0.1 μF, even 0.001 μF, which may be a general high reliability ceramic capacitor. The branch resistor Ra is a resistor of 0.5 to 2 KΩ, preferably 1 KΩ.

Figure 2:
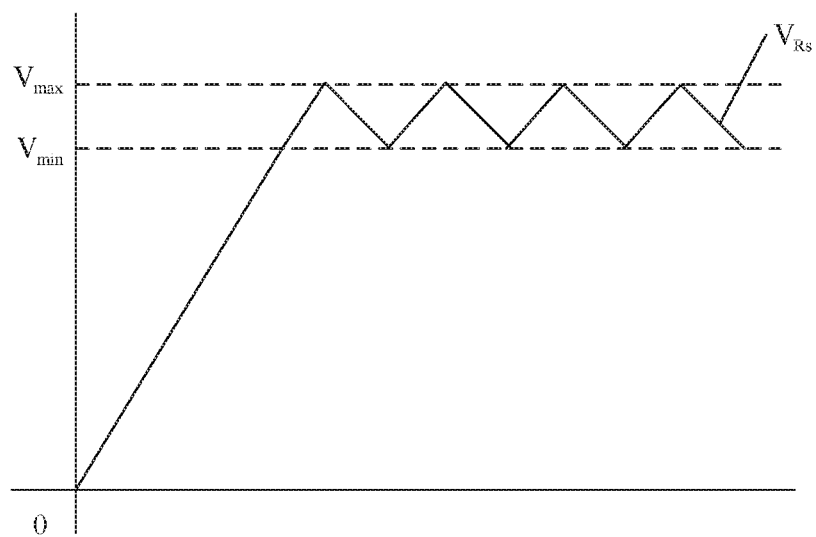
FIG. 2 is a schematic view showing an adjustment of the busbar resistor voltage VRs of the constant current chip of the present invention

As shown in FIG. 2, when the branch constant current source 2 of the busbar current control circuit does not output the branch current IRa to the branch where the branch resistor Ra is located and the power supply VDD is newly connected to the circuit, the first voltage measurement pin 11 and the second voltage measurement pin 12 detect that the busbar resistor voltage VRs is below the minimum rated voltage Vmin. Then the switch pin 13 is turned on. The busbar resistor voltage VRs, the LED load 3, the energy storage inductor L1 and the constant current control chip 1 form a loop so that the busbar resistor voltage VRs gradually rises, and the energy storage inductor L1 is recharged. When the first voltage measurement pin 11 and the second voltage measurement pin 12 of the constant current control chip 1 detect that the busbar resistor voltage VRs is higher than the maximum rated voltage Vmax, the switch pin 13 is turned off. Then the energy storage inductor L1 is discharged. The diode D1 is ON. The busbar resistor voltage VRs, the LED load 3, the energy storage inductor L1 and the diode D1 form a loop so that the busbar resistor voltage VRs gradually decreased. When the first voltage measurement pin 11 and the second voltage measurement pin 12 of the constant current control chip 1 detect that the busbar resistor voltage VRs drops to the minimum rated voltage Vmin, the switch pin 13 is turned on and the above steps are repeated. Through the control of the constant current control chip 1, the positive terminal current IRs of the input LED load 3 tend to be constant, so as to achieve the purpose of LED constant current drive.

Figure 3:
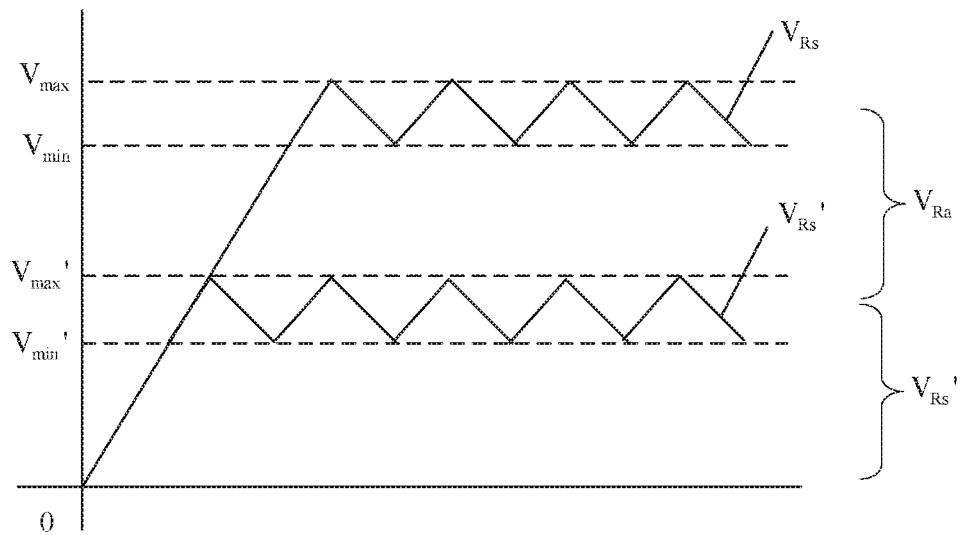
FIG. 3 is a schematic view showing the adjustment of the occupied busbar resistor voltage VRs' after connecting the branch of the present invention

As shown in FIG. 3, when the branch constant current source 2 of the busbar current control circuit outputs branch current IRa to the branch where the branch resistor Ra is located, the branch resistor Ra occupies the busbar resistor voltage VRs over the busbar resistor Rs. If the occupied busbar resistor voltage VRs'+the branch resistor voltage VRa=the busbar resistor voltage VRs, the measured value between the first voltage measurement pin 11 and the second voltage measurement pin 12 of the constant current control chip 1 remains constant. When the magnitude of the branch current IRa output from the branch constant current source 2 varies continuously, accordingly, the branch resistor voltage VRa also varies linearly. As the branch current IRa becomes larger and the branch resistor voltage VRa becomes larger, the occupied busbar resistor voltage VRs' becomes smaller, so that the busbar current IRs input to the positive terminal of the LED load 3 becomes smaller and the brightness of the LED becomes lower. On the contrary, when the branch current IRa becomes smaller, so that the busbar current IRs input to the positive terminal of the LED load 3 become larger, the brightness of the LED will become higher. Accordingly, the continuous, smooth adjustment of the brightness of the LED can be achieved by means of a simple circuit. Therefore, the adjusted maximum rated voltage Vmax will be reduced to Vmax ', the minimum rated voltage Vmin will be reduced to Vmin'.

Figure 4:
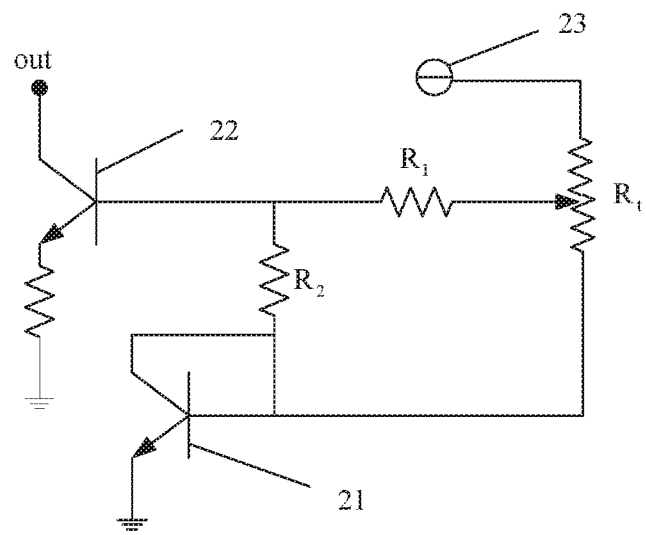
FIG. 4 is a schematic structural view of a preferred embodiment of a branch constant current source of the present invention

As shown in FIG. 4, the branch constant current source 2 of the present invention is preferably a constant current source composed of a first triode 21, a second triode 22, a first resistor R1, a second resistor R2, a variable resistor Rt and a branch power supply 23. Wherein a fixed pin of the variable resistor Rt is connected to the branch power source 23, and the other fixed pin is connected to the base of the first triode 21, the moving pin is connected to one end of the first resistor R1; the two ends of the second resistor R2 is respectively connected to the other end of the first resistor R1 and the base of the first triode 21, and the other end of the first resistor R1 is connected to the base of the second triode 22; the collector of the first triode 21 is connected to its own base and its emitter is grounded; the collector of the second triode 22 is used as the output of the constant current source and its emitter is grounded through a resistor, which is preferably a resistor of 20 KΩ. The first resistor R1 in the present embodiment is a resistor of 300 to 600 KΩ, preferably a resistor of 400 KΩ. The second resistor R2 is a resistor of 70 to 150 KΩ, preferably a resistor of 100 KΩ.

The first triode 21 may be replaced by a diode. The positive terminal of the diode is connected to the other fixed pin of the variable resistor Rt. The positive terminal of the diode is also connected to a position between the base of the second triode 22 and the variable resistor Rt. The negative terminal of the diode is grounded.

It should be noted that the specific embodiments described above may enable those skilled in the art to more fully understand the invention, but not in any way limit the invention. Accordingly, although the present specification has been described in detail with reference to the accompanying drawings and examples, it will be understood by those skilled in the art that modifications may be made to the present invention or equivalents may be substituted for the purposes of the present invention. In summary, all technical solutions and modifications that do not depart from the spirit and scope of the present invention are intended to be encompassed by the scope of the invention as claimed.

The invention claimed is:

1. A busbar current control circuit comprising a branch resistor, a branch capacitor and a branch current source, wherein the branch resistor and the branch capacitor are connected in parallel to form a branch; one end of the branch is connected to a position between a busbar resistor and a load, and another end is connected to the branch current source; and the branch current source outputs a current of adjustable magnitude to the branch;

wherein the branch capacitor is a capacitor of 0.01 to 0.22 μF, and the branch resistor is a resistor of 0.5 to 2 KΩ, the branch current source is a constant current source; and wherein the constant current source comprises a first triode, a second triode, an equivalent voltage input source and a branch power source; the equivalent voltage input source is a variable resistor, wherein a fixed pin of the variable resistor is connected to the branch power source and another fixed pin is connected to a base of the first triode, a moving pin of the variable resistor is connected to a base of the second triode; the base of the first triode is connected to a position between the base of the second triode and the moving pin, and a collector of the first triode is connected to the base of the first triode and an emitter of the first triode is grounded; a collector of the second triode is used as the output of the constant current source and an emitter of the second triode is grounded.

2. The busbar current control circuit according to claim 1, wherein the first triode is configured to be replaced with a first diode, wherein a positive electrode of the first diode is simultaneously connected to the another fixed pin, the base of the second triode and the moving pin, a negative electrode of the first diode is grounded, and the equivalent voltage input source is a variable resistor or other variable voltage input circuit.

3. The busbar current control circuit according to claim 2, wherein the constant current source further comprises a first resistor and a second resistor, the first resistor being connected between the base of the second triode and the moving pin, one end of the second resistor being connected between the first resistor and the base of the second triode, and the other end being connected to the other fixed pin; the emitter of the second triode is grounded through a resistor.

4. A constant current drive controller comprising a busbar current control circuit wherein the busbar current control circuit comprises a branch resistor, a branch capacitor and a branch current source, wherein the branch resistor and the branch capacitor are connected in parallel to form a branch; one end of the branch is connected to a position between a busbar resistor and a load, and another end of the branch is connected to the branch current source; and the branch current source outputs a current of adjustable magnitude to the branch, a constant current control chip, the busbar resistor, a diode and an energy storage inductor, the constant current control chip comprises a first voltage measurement pin, a second voltage measurement pin and a switch pin; the two ends of the busbar resistor are respectively connected to a power supply and the positive terminals of the load, the negative terminal of the load is connected to one end of the energy storage inductor, another end of the energy storage inductor is connected to the positive terminal of the diode and the switch pin, the first voltage measurement pin is connected to a position between the busbar resistor and the power supply; one end of the branch formed by the branch resistor and the branch capacitor connected in parallel in the busbar current control circuit is connected to a position between the busbar resistor and the load, the another end of the branch is connected to the second voltage measurement pin; a sum of the voltage on the busbar resistor and the voltage on branch resistor remains constant.

5. The constant current drive controller according to claim 4, wherein the branch capacitor is a capacitor of 0.01 to 0.22 μF, and the branch resistor is a resistor of 0.5 to 2 KΩ, the branch current source is a constant current source.

6. The constant current drive controller according to claim 5, wherein the constant current source comprises a first triode, a second triode, an equivalent voltage input source and a branch power source; the equivalent voltage input source is a variable resistor, wherein a fixed pin of the variable resistor is connected to the branch power source and another fixed pin is connected to a base of the first triode, a moving pin of the variable resistor is connected to a base of the second triode; the base of the first triode is connected to a position between the base of the second triode and the moving pin, and a collector of the first triode is connected to the base of the first triode and an emitter of the first triode is grounded; a collector of the second triode is used as the output of the constant current source and an emitter of the second triode is grounded.

7. The constant current drive controller according to claim 4, wherein the first voltage measurement pin and the second voltage measurement pin are used for measuring a voltage between the busbar resistor and the branch resistor.

8. The constant current drive controller according to claim 4, wherein the constant current control chip is a switching constant current driving chip; the first voltage measurement pin is a power input terminal of the switching constant current driving chip.

9. The constant current drive controller according to claim 4, wherein the constant current control chip, the busbar resistor, the diode and the energy storage inductor are hybridly packaged.

10. The constant current drive controller according to claim 4, wherein the load connected to the constant current drive controller is an LED load.

\* \* \* \* \*